Sept. 29, 1925.
A. KADOW ET AL
1,555,216
GLASS BLOWING SPINDLE APPARATUS
Filed Jan. 26, 1924
5 Sheets-Sheet 1
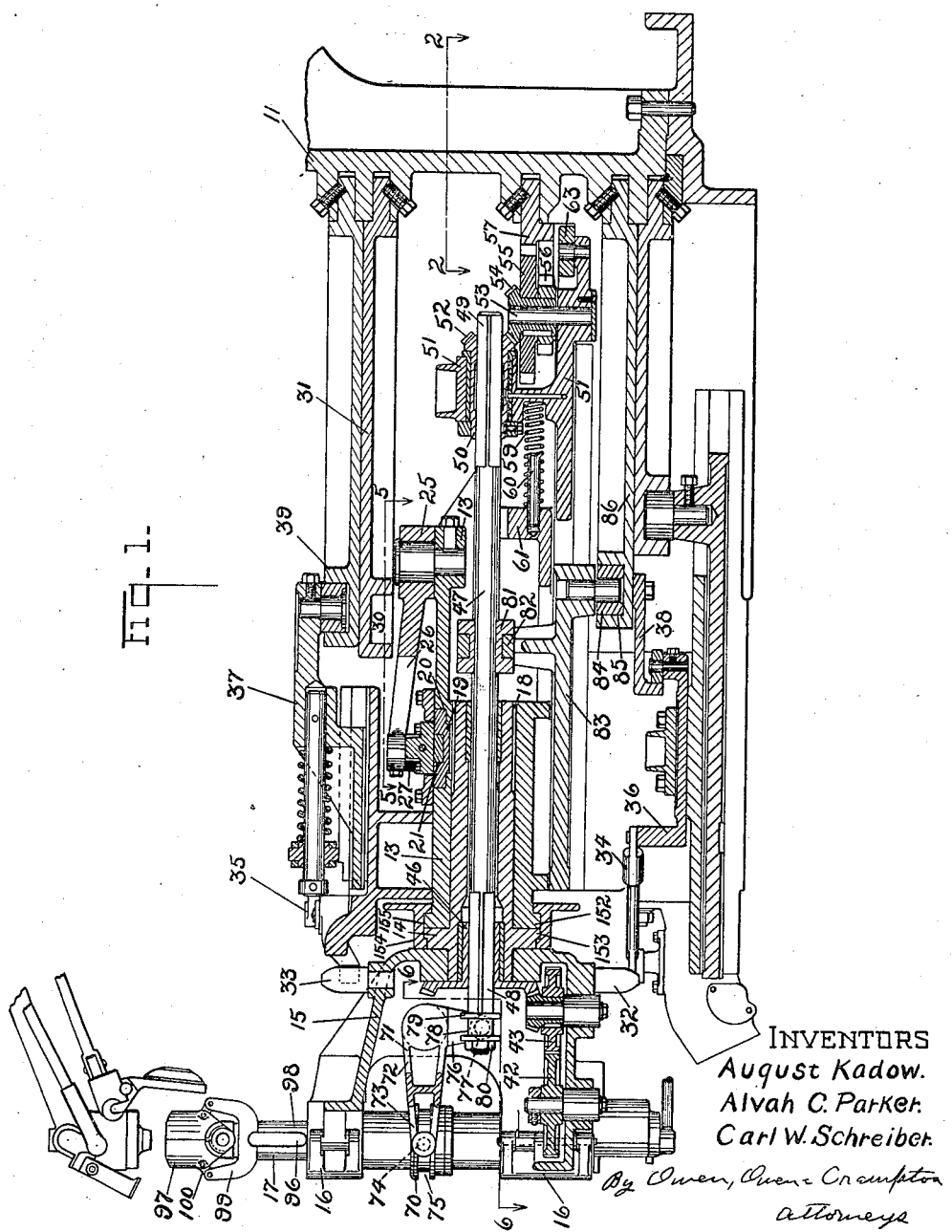
INVENTORS
August Kadow.
Alvah C. Parker.
Carl W. Schreiber.
By Owen, Owen & Crampton
Attorneys Sept. 29, 1925.
A. KADOW ET AL
1,555,216
GLASS BLOWING SPINDLE APPARATUS
Filed Jan. 26, 1924   5 Sheets-Sheet 2
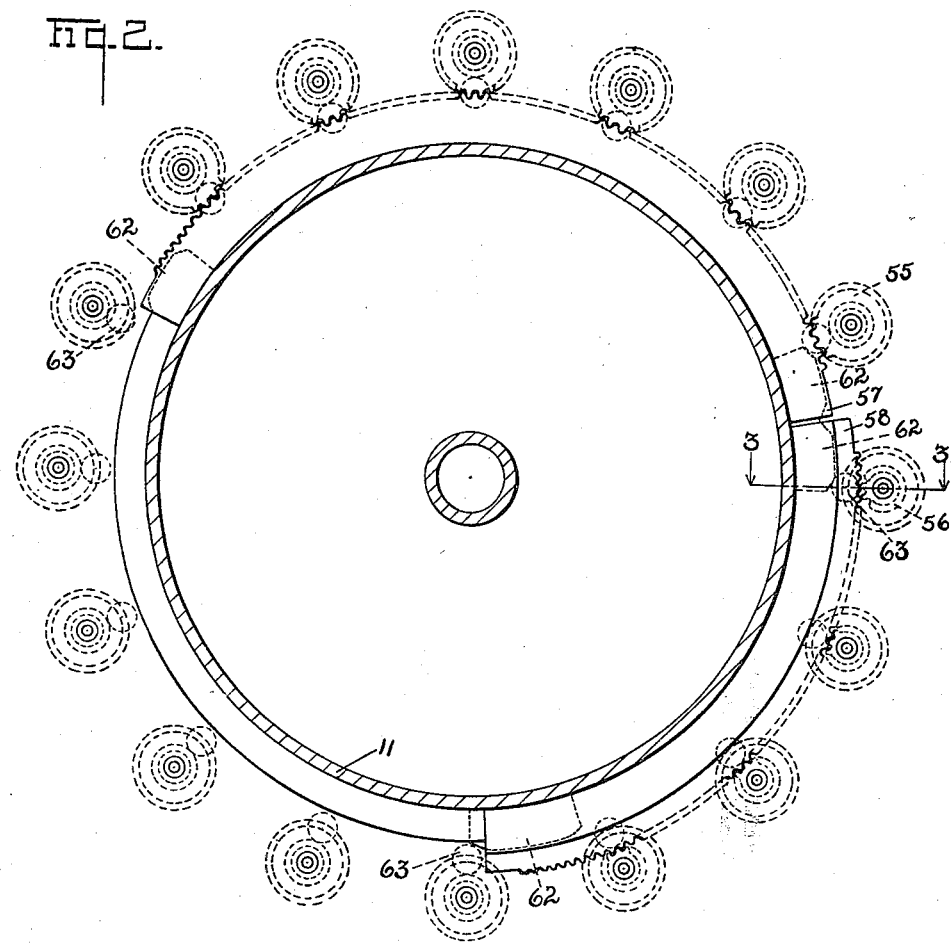
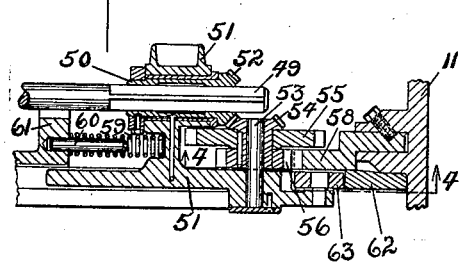
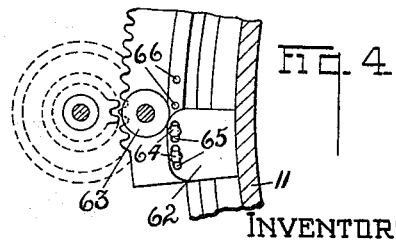
INVENTORS
August Kadow.
Alvah C. Parker.
Carl W. Schreiber.

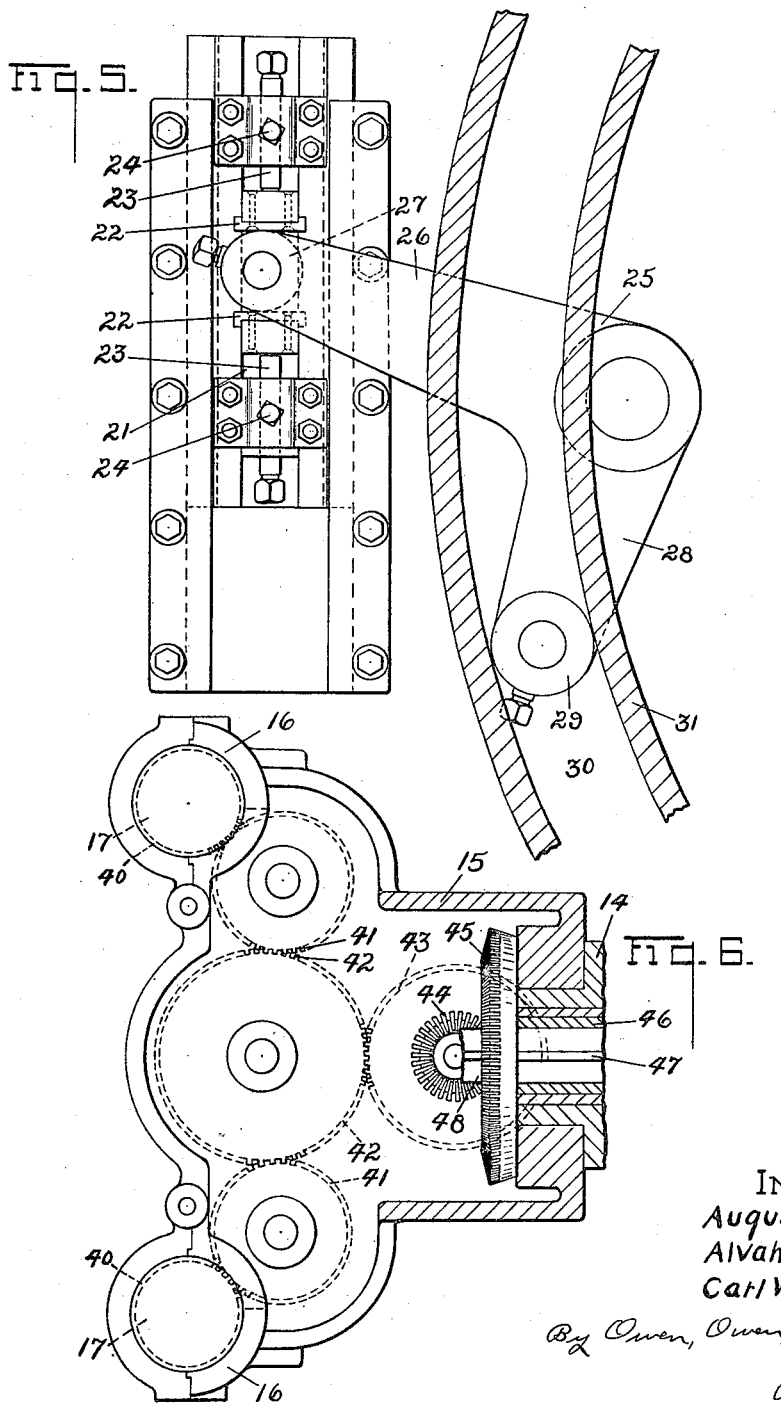

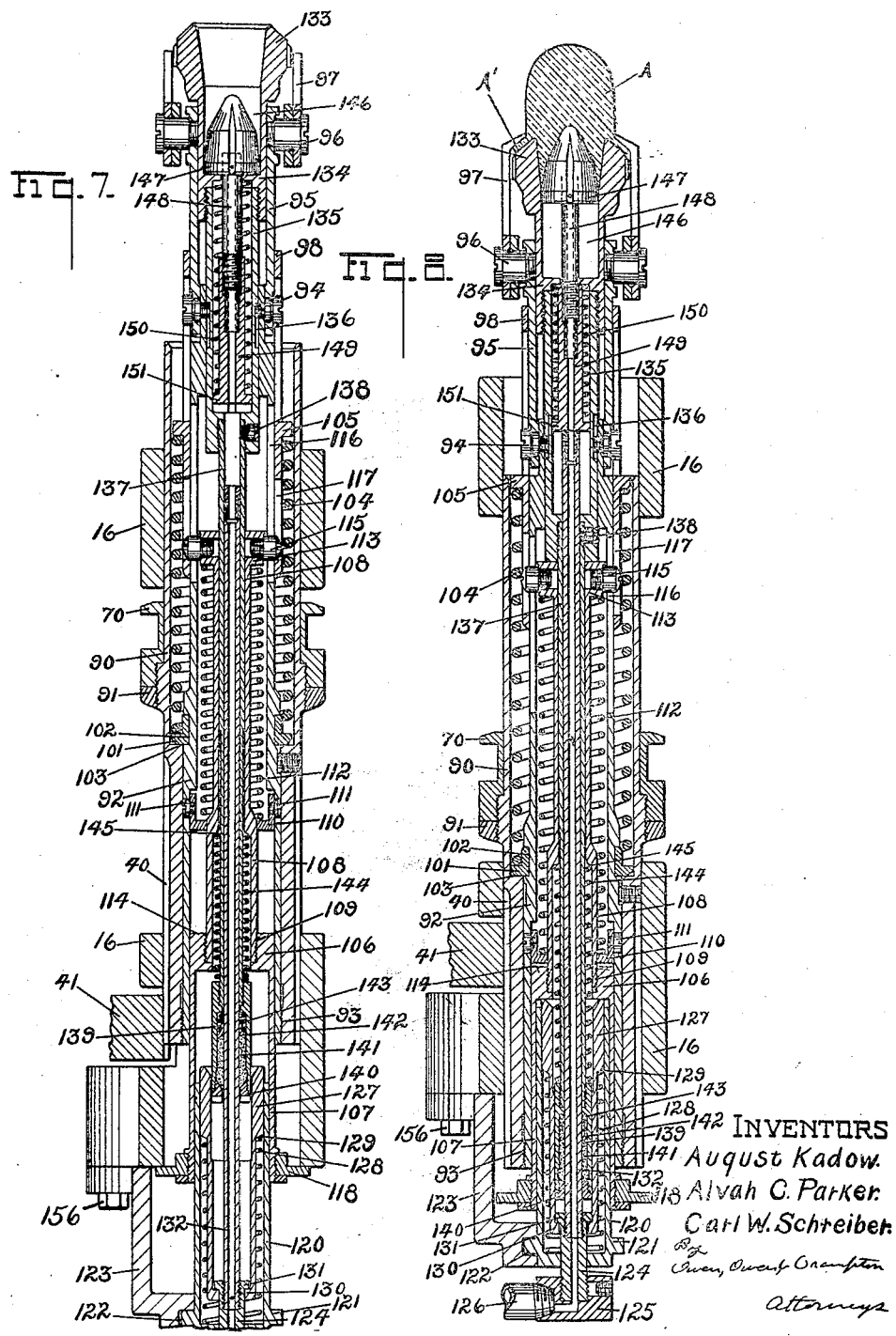

Sept. 29, 1925.　　　　　A. KADOW ET AL　　　　　1,555,216
GLASS BLOWING SPINDLE APPARATUS
Filed Jan. 26, 1924　　　5 Sheets-Sheet 5
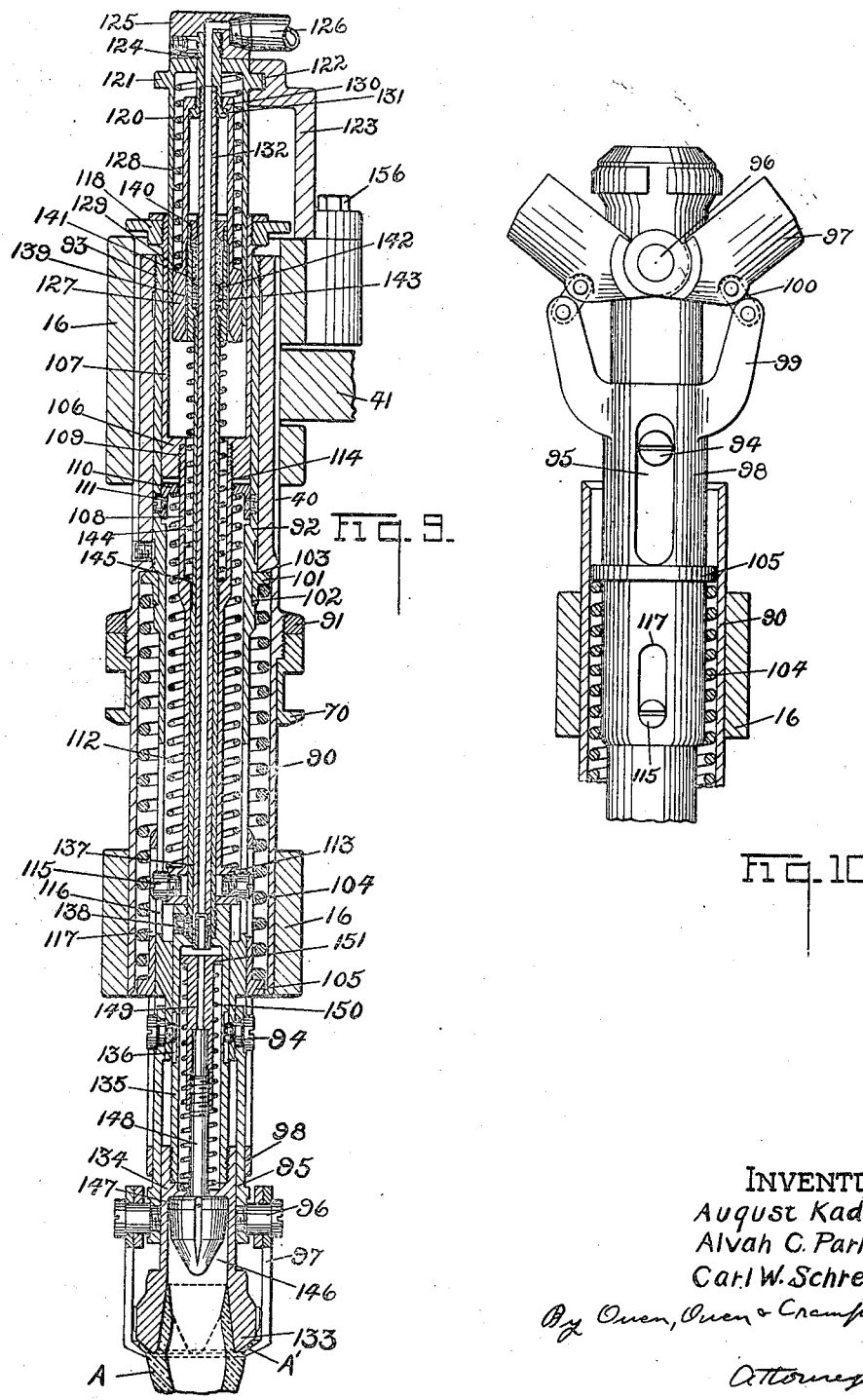
INVENTORS
August Kadow.
Alvah C. Parker.
Carl W. Schreiber.
By Owen, Owen & Crampton
Attorneys Patented Sept. 29, 1925.

1,555,216

UNITED STATES PATENT OFFICE.

AUGUST KADOW, ALVAH C. PARKER, AND CARL W. SCHREIBER, OF TOLEDO, OHIO, ASSIGNORS TO THE LIBBEY GLASS MANUFACTURING COMPANY, OF TOLEDO, OHIO, A CORPORATION OF OHIO.

GLASS-BLOWING-SPINDLE APPARATUS.

Application filed January 26, 1924. Serial No. 688,726.

*To all whom it may concern:*

Be it known that we, AUGUST KADOW, ALVAH C. PARKER, and CARL W. SCHREIBER, citizens of the United States, and residents of Toledo, in the county of Lucas and State of Ohio, have invented a new and useful Glass-Blowing-Spindle Apparatus, which invention is fully set forth in the following specification.

Our invention relates to an improvement in glass blowing spindles and the operating mechanism therefor, and has for its object to shorten the spindle, reduce the space occupied by its operating mechanism, and generally to reduce the weight, size and operating force required by this mechanism.

Another object is to so construct the parts that a spindle carrying yoke may be readily removed from the machine.

Another object is to arrange the parts so that the packing gland about the air pipe within the spindle will be easily accessible, and will be distant from the glass carrying end.

Another object is to so arrange the parts as to avoid the necessity for thrust bearings within the spindle.

Other objects and advantages of the invention will appear as the description proceeds.

In general, the apparatus of this invention is similar to apparatus disclosed in prior patents granted to August Kadow, such as Serial No. 1,248,664, granted December 4th, 1917, and Serial No. 1,331,772, granted February 24th, 1920, and our invention consists essentially in improvements in such apparatus, though some of the features might be applied to glass spindles used in different glass working apparatus.

Referring to the accompanying drawings illustrating a machine embodying our invention, Fig. 1 is a longitudinal vertical section of one of the units of our improved machine. Fig. 2 is a partial horizontal section on the line indicated at 2—2 in Fig. 1. Fig. 3 is a section on the line 3—3 of Fig. 2. Fig. 4 is a section on the line 4—4 of Fig. 3. Fig. 5 is a section on the line 5—5 of Fig. 1. Fig. 6 is a section on the line 6—6 of Fig. 1. Figs. 7, 8 and 9 are longitudinal sections of the spindle with parts in different positions, and Fig. 10 is a view of an end of the spindle viewed at right angles to its showing in the other views.

As in the patents cited above, the machine consists of a plurality of units, there being sixteen indicated in Fig. 2, rotating about a central drum 11. The units are supported in a rotating frame, not shown, which may be similar to that shown in said patents. Each unit carries two spindles, which receive blanks from appropriate blank formers, develop the blanks, position them properly to be enclosed within blow molds, blow and finally release the blown articles.

The general structure and operation of the device is similar to that shown and described in said patents, the chief distinction being in the structure of the spindle and the arrangement of the operative parts, whereby much less mechanism is required to operate the spindles, and it is possible to shorten the spindles, rendering the machine much lighter, easier to manufacture, and requiring less power to operate.

Each spindle must oscillate about a transverse axis, and rotate about its longitudinal axis, and the parts of the spindle must have relative movement. Each spindle has a blank holder, jaws for gripping the blank to the holder, and a plunger, each of which must partake of the motion of the spindle as a whole and have independent motion as well.

The spindles are oscillated about a transverse axis, as follows:—

A casting mounted in any convenient way on the rotating frame, bears a journal 13 for a hub 14, which carries a yoke 15. The yoke carries two bearings 16 for each of two spindles 17, so that turning the hub within its journal oscillates the spindle about a transverse axis.

The inner end of the hub has gear teeth 18 cut therein. A rack 19, in mesh with the hub teeth 18, is slidable transversely of the hub in a guideway 20 in the journal 13. The rack has a slideway 21 on its upper surface, or back, and two abutment blocks 22, are adjustably fixed in the slideway by means of pins 23, held in adjusted position by set screws 24. A bell crank lever 25 is fulcrumed on the journal 13, and one arm 26 carries a roller 27, working between the blocks 22, while the other end 28 carries a roller 29, working in a groove 30 in a cam plate 31, carried by the central drum. As will be seen, the contour of the cam groove 30 governs the oscillation of the spindles about the transverse axis.

When the yoke is to be held with the spindles in the exact vertical position desired, positioning pins 32, 33 are positioned by suitable devices 34, 35 controlled by slides 36, 37, operated by cams 38, 39, carried by the central drum 11.

The rotation of the spindle upon its longitudinal axis is effected as follows:—

Each spindle bears gear teeth 40, which mesh with a pinion 41. The two pinions 41 in each yoke, mesh with a pinion 42 that meshes in turn with a pinion 43, having affixed to it a bevel gear 44, in mesh with a bevel gear 45, carried by a sleeve 46, rotatably mounted within the hub 14.

A shaft 47 is journalled within the hub 14, and its outer squared end 48 is slidable through and drives the sleeve 46, while its inner squared end 49 is slidable through and is driven by a sleeve 50, mounted in a sliding block 51 and driven by a bevel gear 52. The sliding block 51 carries a stub shaft 53, to which are fixed a bevel gear 54 and spur gears 55 and 56. The bevel gear 54 is in mesh with the gear 52, while gears 55 and 56 are adapted to mesh with racks 57 and 58, respectively, fixed upon the drum 11. A spring 59, guided by a pin 60, is compressed between the sliding block and an abutment 61 on the casting 12, and normally presses the block inward, so as to hold gear 55 or 56 in mesh with the rack 57 or 58 which the head is passing at the time. A series of cams 62 are adjustably mounted on the drum 11 in position to contact a roller 63 on the sliding block and force the block away from the drum so that the gears 55, 56 will not mesh with the racks 57, 58. Preferably, the cams are fastened to the under faces of the racks by bolts 64, passing through slots 65 in the cams, as shown in Fig. 4. A series of holes 66 may be provided in the racks, if more extensive adjustments are desired. These cams provide for the proper entrance of the gears into mesh with the racks, as well as furnishing convenient means for adjusting the operative lengths of the racks. Two gears of different sizes are provided, so that the spindles may be rotated at different speeds during different portions of the path through which they travel.

The relative movements of different portions of the spindle are produced by the actuation of a collar 70 longitudinally of the spindle. A bell crank lever 71 is mounted in each yoke, and one arm 72 of the lever has two forks 73, one for each spindle carried by the yoke, each fork bearing rollers 74 working in a groove 75 in the collar 70. The other arm 76 of the lever is forked and carries rollers 77 working in a groove 78 in a collar 79, held in place by a nut 80, on the reduced outer end of shaft 47. Between the hub 14 and the sliding block 51, the shaft 47 has affixed to it a collar 81. A ring 82 is fitted into a groove in this collar. The ring is carried by a slide 83, which carries a roller 84, working within a cam groove 85 in a cam plate 86, fixed to the central drum. By this means the collars 70 are moved with relation to the yoke.

The construction of the spindle is as follows:—

The collar 70 is locked upon an outer casing 90, by means of a locknut 91. The casing has formed thereon the teeth 40, which are long enough so that they will remain in mesh with the gear 41 during the longitudinal movements of the casing. An inner casing 92 extends through the outer casing, the two casings being threaded together at the inner end, as at 93, so that they move together. The inner end of the inner casing fits snugly within the outer casing, but the two casings are spaced apart at the outer end. The outer end of the inner casing has affixed to it, as by screws 94, an extension 95. The extension 95 carries pins 96, upon which are pivoted the blank holding jaws 97. A jaw sleeve 98 surrounds the extension, and has arms 99, which are connected by links 100 to the jaws 97. As will be seen, relative movement between the extension and jaw sleeve will open or close the jaws. The inner end of the jaw sleeve is between the inner and outer casing. A bearing ring 101 is fixed in a groove 102 in the outside wall of the inner casing and against a shoulder 103 on the inside of the outer casing. A spring 104 is compressed between the bearing ring 101 and a shoulder 105 on the jaw sleeve, and normally presses the sleeve outward to close the jaws.

A stop sleeve 106 is slidably mounted within the inner casing. The inner end 107 of the stop sleeve fits snugly within the casing. The outer end 108 of the stop sleeve is threaded into the inner part at 109.

A bearing ring 110 is fastened inside of the casing by screws 111, and a spring 112 is compressed between this bearing ring and an enlargement 113, on the inner end of the stop sleeve. When the jaws are not holding a blank, the spring normally thrusts the stop sleeve towards the outer end of the casing until the shoulder 114, formed by the junction of the two parts of the sleeve, encounters the bearing ring 110. Screws 115 are threaded into the stop sleeve enlargement 113 and project through slots 116 in the inner casing and through shorter slots 117 in the jaw sleeve 98. When the casing is moved outward a stop ring 118, on the inner end of the stop sleeve, encounters the bearing 16, and thereby stops movement of the sleeve. When screws 115 encounter the inner ends of the slots 117, the movement of the jaw sleeve is stopped, and further movement of the casing produces relative movement between the casing and jaw sleeve, compressing spring 104 and opening the jaws.

A cap 120 projects within the inner end of the stop sleeve. The cap is held against movement transversely of the axis of the yoke by a ring 121, which is received in a groove 122 in an arm 123, fixed on the yoke. A tubular air plug 124 passes through the end of the cap and has a connection 125, which receives the end of a flexible pipe 126, conducting air from a suitable source. A yielding socket 127 fits within the cap, and a spring 128 is compressed between the end of the cap and a shoulder 129 on the socket and urges a shoulder 130 in the socket against a shoulder 131 on the end of the air plug, and thus tends to keep the connection 125 pressed against the cap. An air pipe 132 is screwed into the air plug.

A blank receiver 133, adapted to have a blank clamped thereon by jaws 97, is borne by a carrier sleeve made up of three sections. The outer section 134 of the carrier sleeve slides within the extension 95 and is fixed on the end of the intermediate section 135, which extends within the outer end of the inner casing, and has slots 136, which receive the ends of screws 94, which unite the extension to the inner casing. The inner end of this section 135 is screwed on to an inner section 137, and is fixed in position thereon by a set screw 138. The inner section 137 constitutes a sleeve surrounding the air pipe 132. A box 139 is screwed on to the inner end of the section 137 and has its inner end closed by a nut 140. Packing 141 within the box is compressed between the nut 140 and a follower 142, by a spring 143, which exerts pressure on the follower. This stuffing box prevents leakage of air between the inner end of the blank carrying sleeve and the air pipe.

A spring 144 surrounds the inner end of the inner section 137 of the blank carrying sleeve, and is compressed between a shoulder 145, within the stop sleeve section 108, and the box 139 on the inner end of the blank carrying sleeve, thereby normally pressing the blank carrying sleeve inward until the intermediate section 135 contacts the end of the stop sleeve. When the casing is moved outward the ends of the screws 94 move in the slots 136 until the outer ends of the slots are reached, after which the blank carrying sleeve is moved with the casing, compression spring 144, as shown in Fig. 7.

The blank carrier is socketed, as at 146, to receive a plunger 147, which has a stem 148 screwed into a plunger sleeve 149. A spring 150 is compressed between the blank carrier and a shoulder 151 on the plunger sleeve, thereby tending to hold the plunger in its retracted position, as shown in Figs. 7 and 9. When the casing is moved inward, the end of the air pipe 132 contacts the inner end of the plunger sleeve and presses the sleeve and plunger out, compressing spring 150, as shown in Fig. 8. This brings pressure to bear upon the air pipe which tends to compress spring 128, as shown in Fig. 8; but spring 128 is stiff enough to resist such compression until the end of sleeve 149 contacts a shoulder on the carrier sleeve. This insures a uniform insertion of the plunger.

It will be seen from the above description that the necessary relative motion of the parts of the spindle will result from movements of the collar 70.

It is thought that the operation of the device can be understood from the description thus far given, but for convenience the operation will be briefly summarized.

The cam groove 30 is so shaped that the outer or blank receiving end of the spindle is turned up at the proper position to receive a blank, and the cam groove 85 is so shaped that the collar 70 will be raised at this point, carrying upward the casing members the full distance therewith, the stop sleeve until the stop collar encounters the bearing, the jaw sleeve until the end of the slots 117 are reached by screws 115, and the blank carrier after the screws 94 reach the upper ends of the slots 136. A blank A is then dropped on to this blank carrier, with a flange A' in proper position thereon. Cam groove 85 is so shaped that the collar 70 will be lowered immediately after the blank is received, resulting in lowering the blank holder with the blank thereon until the shoulder rests upon the end of the stop sleeve, in closing the jaws under the influence of spring 104 and, finally, in the outward thrust of the plunger, due to contact with the comparatively fixed air pipe. The shape of the cam groove 85 is such that the collar 70 is then returned to a medium position, where the plunger will be withdrawn and the blank held by the jaws, under the influence of spring 104 pressed against the outside of the flange A', and the blank holder, under the influence of spring 112 pressed against the inside of the flange, as shown in Fig. 9.

Cam groove 30 is shaped to swing the spindle with the blank thereon to properly form and elongate the blank, after which it brings it to rest over the blow mold. In the meantime the spindle is rotated by rack 57 engaging gear 55, as shown in Fig. 1 and the upper part of Fig. 2. During blowing the rotation is caused by the meshing of rack 58 and gear 56, as shown at the lower right side of Fig. 2. The cam groove 85 is so shaped as to thrust the collar 70 downward and open the jaws and discharge the article immediately after the blow mold is opened. Thereafter the blank receiving end of the spindle is swung up to receive another blank, and the series of motions is repeated.

It will be understood, of course, that air is admitted at proper times in regulated amounts and at regulated pressures, to blow the blank as desired.

By locating the mechanism for rotating the spindle on a transverse axis on one side of the supporting hub, the mechanism for rotating it on its longitudinal axis back of the hub, and the mechanism for operating the collar on the other side of the hub, a very compact arrangement results, because of which the vertical distance between the blank former and the blow mold may be lessened, the spindle shortened, and the weight of the machine greatly decreased. The spindle oscillating means takes up less vertical space than that of said former patents, and the racks and spur gears take up less vertical space than the corresponding parts disclosed in said Patent No. 1,331,772. The same result is contributed to by the construction of the spindle to produce all relative movements of the parts from one cam, thereby eliminating a number of cams which are necessary in such a construction as shown in said Patent 1,248,664. Reconstruction of the spindle, as by placing the jaw operating sleeve and spring within the casing, where it may be within a bearing 16 instead of outside of the casing and beyond the bearings, as previously disclosed, contributes to the same result of compactness and shortening of the spindle.

As the circumference of the machine is increased and the number of units is increased the angle between their transverse axes decreases, so that danger of interference between adjacent heads is increased. Shortening of the spindles is therefore of further advantage in allowing the spindles to be placed comparatively close together in a circle of large circumference without danger of interference between the spindles of adjacent units, and makes practicable an increase in the number of units in a machine, thereby decreasing the cost of production, as a large machine requires about the same amount of supervision as a small one.

Squaring the outer end of shaft 47 enables it to move longitudinally without destroying its operative relation to the gear 45. This makes possible the use of the shaft to operate the bell-crank, instead of using a sleeve surrounding the shaft, as in Patent No. 1,331,772. Elimination of the sleeve reduces the necessary size of the surrounding hub and journal, and so saves not only the original cost and the subsequent force employed in moving the sleeve, but makes it possible for the surrounding parts to be lighter.

The journal 13 has an outwardly projecting flange 152, and the hub 14 has a similar flange 153. A collar 154 has an inner groove 155 adapted to fit over flanges 152 and 153 and so hold the hub within the journal. The collar is separable, so that it can be removed readily. Whenever necessity arises, the yoke with the parts it supports may be removed from the machine after removing nut 80 and collar 154. This makes possible the substitution of one yoke unit for another with only a brief delay in the operation of the machine.

The cap 120, air pipe 132 and socket 127 do not rotate with the spindle. The cap is freely slidable and rotatable within the surrounding stop-sleeve 107, the socket 127 is freely rotatable and slidable about the packing box 139, and the air pipe 132 is freely slidable and rotatable within the carrier sleeve, escape of air being prevented by the packing gland. The other parts of the spindle revolve as a unit, so that there is no necessity for any thrust bearing within the spindle, such as shown in Patent 1,248,664.

The arm 123 is easily removable, as by removing bolt 156, and this permits the withdrawal of cap 120, socket 127, and pipe 132; but ordinarily, when a spindle needs repairing, it is removed from the machine by opening the yoke bearings, and another spindle substituted, so as not to interrupt the operation of the machine longer than necessary. As will be seen, access may be had to the packing gland much more easily than to the corresponding gland disclosed in Patent No. 1,248,664. Furthermore, the packing gland is distant from the glass carrying end of the spindle, and thereby injurious heating of the packing is avoided.

We have shown and described one manner of utilizing said invention, but it is obvious that various changes within the scope of the appended claims may be made without departing from the spirit of the invention.

We claim:

1. In combination, a glass carrying spindle journaled in two bearings, jaws for clamping a blank upon the spindle, and jaw closing means mounted to move inside of one of said bearings.

2. In combination, a glass carrying spindle including clamping jaws and a jaw closing spring, and two bearings within which the spindle is mounted for rotation about its longitudinal axis, the said spring being in the portion of the spindle passing through one of the bearings.

3. In combination, a glass carrying spindle including clamping jaws and jaw operating means, and a member having a bearing within which the spindle is mounted for rotation about its longitudinal axis and having a hub journaled on an axis normal to that of the spindle, the jaw operating means being in the portion of the spindle passing through said bearing.

4. In combination, a glass carrying spindle including clamping jaws and a jaw operating spring, and a member having two bearings within which the spindle is mounted for rotation about its longitudinal axis, said member being mounted for movement about an axis transverse to the spindle and the said spring being in the portion of the spindle passing through the bearing nearest the jaws.

5. In combination, a glass carrying spindle having clamping jaws and jaw operating means, a bearing within which the spindle is mounted to rotate about its longitudinal axis, blank forming means above the spindle, a mold beneath the spindle, means to actuate said bearing to move the jaws between a position adjacent the blank former and a position adjacent the mold, the jaw operating means being in the portion of the spindle passing through the bearing.

6. In a glass carrying spindle, clamping jaws, a hollow cylindrical casing having an annular socket in its end towards the jaws, and jaw-operating means within the socket.

7. In combination, a spindle comprising a glass carrier and a plunger, a support, means to move said carrier relatively to the support, an arm on the support carrying a longitudinally slidable thrust member in position to operate the plunger when the carrier is moved by said means, and a coil spring surrounding the thrust member and urging it towards the plunger.

8. In combination, a journal, a spindle mounted for rotation in the journal and for movement axially of the journal and comprising a glass carrier and a plunger, an arm on the journal, an air pipe slidably supported on the arm in position to operate the plunger when the carrier is moved axially of the journal, and a coil spring surrounding the air pipe and urging it towards the plunger.

9. In combination, a journal, a spindle comprising a glass carrier, a plunger, and a spring normally holding the plunger away from glass on the carrier, means to move the carrier towards and from the journal, an air pipe slidably mounted on the journal and projecting into the spindle and a spring surrounding the pipe and holding it in position to operate the plunger when the carrier is moved by said means, and to admit air into the cavity formed by the plunger.

10. In a glass blowing machine, a spindle comprising a glass carrier and a plunger, a yoke having bearings for the spindle, an air pipe carried by the yoke and projecting into the spindle along its axis, and means to move the spindle longitudinally in its bearings to bring the plunger into and out of contact with the air pipe, the pipe being held in the spindle solely by its connection with the yoke.

11. In a glass blowing machine, a spindle comprising a glass carrier, a plunger, and a spring normally holding the plunger away from glass on the carrier, a bearing for the spindle, an air pipe carried by a support attached to the bearing and projecting into the spindle along its axis towards the plunger, means to move the spindle longitudinally in its bearing to bring the plunger into and out of contact with the air pipe, and a packing gland sealing the space between the end of the pipe adjacent the support and the surrounding portion of the spindle.

12. In combination, a rotatable spindle, glass-carrying means at one end of the spindle, a non-rotatable air pipe supported beyond the other end of the spindle and projecting into the spindle towards the glass-carrying end, and a packing gland between the pipe and the end of the spindle adjacent the pipe support.

13. In combination, a spindle comprising a glass carrier, clamping jaws, and a plunger, a support with respect to which the carrier has limited motion, a stop member adapted to contact the support and open the jaws when the carrier is moved towards one limit of its motion, an arm on the support carrying a slidable thrust member and a spring surrounding the member and holding it in position to operate the plunger when the carrier is moved towards its other limit of motion.

14. In combination, a glass-carrying spindle, a spindle-carrying yoke having a horizontal hub with spur teeth, a rack slidably mounted above the hub, and means to reciprocate the rack and thereby move the glass-carrying end of the spindle between an upwardly directed position and a downwardly directed position.

15. In combination, a yoke, a glass-carrying spindle journaled for rotation about its longitudinal axis in the yoke, a hub on the yoke journaled to oscillate on an axis transverse to that of the spindle, means on one side of the hub to oscillate it, means on the other side of the hub to produce relative longitudinal movement of parts of the spindle, and means substantially in line with the hub connected through the hub to the spindle to rotate it on its longitudinal axis.

16. In combination, an upright column, a plurality of spindle-carrying yokes arranged about the column and having hubs projecting inwardly towards the column, each hub having spur teeth thereon, a rack slidable transversely of each hub, a bell-crank lever for each rack, the levers being pivoted on vertical axes, one arm of each lever being connected to a rack, and a cam plate on the column having a groove engaging a roller on each of the cranks.

17. A rotatable glass-carrying spindle having relatively movable parts, a shaft, means to rotate the shaft, means to move the shaft longitudinally, and connections between the shaft and spindle whereby rotation of the shaft causes rotation of the spindle and longitudinal movement of the shaft causes movement of parts of the spindle relatively to each other.

18. In combination, a column, a support rotatable about the column, a spindle rotatably mounted in the support, a shaft mounted in the support, gearing connecting one end of the shaft to the spindle, gearing connected to the other end of the shaft, and a rack mounted on the column with its teeth projecting towards the path of the spindle in position to engage the last said gearing.

19. In combination, an upright column, a plurality of racks arranged in succession at different heights about the column and having teeth projecting outwardly therefrom, a glass-carrying spindle revolving about the column, a slide revolving with the spindle, a plurality of spur gears affixed to a vertical shaft pivoted in the slide, cams controlling the position of the slide and moving it to bring the gears into and out of mesh with the racks, and connections between the said shaft and the spindle whereby rotation of the shaft causes rotation of the spindle upon its longitudinal axis.

20. In combination, an upright column, a plurality of racks arranged in succession at different heights about the column and having teeth projecting outward therefrom, a spindle revolving about the column, a vertical shaft revolving with the spindle, a plurality of spur gears affixed to the shaft in position to mesh with the corresponding racks, and operative connections between the shaft and spindle.

21. In combination, an upright column, a plurality of glass-carrying spindles revoluble about the column, supports for the spindles, each support having a hub with its axis radial of the column, a cam plate on the column above the hub, connection between the cam and hub to oscillate the hub, a cam plate on the column beneath the hub, connection between the last said cam and the spindle, a rack on the column between the cam plates and having its teeth projecting outward, a spur gear on a vertical axis in position to mesh with the rack, and connections between the gear and the spindle.

22. In combination, a rotatable glass-carrying spindle having relatively movable parts, a shaft having a squared portion adjacent the spindle, a gear slidable on said squared portion and operatively connected to the spindle, whereby rotation of the shaft causes rotation of the spindle, a removable collar on the end of the shaft adjacent the spindle, and connections between the collar and the spindle whereby longitudinal movement of the shaft causes movement of the parts of the spindle relatively to each other.

23. In combination, a spindle, a spindle support having a flanged hub, a flanged journal for the hub, and a separable collar embracing said flanges and holding the hub in the journal.

24. In combination, a rotatable spindle adapted to carry a charge of glass at its outer end, a relatively stationary air-pipe projecting into the inner end of the spindle, and a packing gland surrounding the pipe within the inner end of the spindle.

25. In combination, a rotatable spindle adapted to carry a charge of glass at its outer end, a relatively stationary air-pipe projecting into the inner end of the spindle and axially therealong, and a support connected to the pipe outside of the spindle, the pipe being held within the spindle solely by said support.

In testimony whereof we have hereunto subscribed our names to this specification.

AUGUST KADOW.
ALVAH C. PARKER.
CARL W. SCHREIBER.